United States Patent
Roszel et al.

(10) Patent No.: US 10,496,154 B2
(45) Date of Patent: Dec. 3, 2019

(54) ACTIVE NOISE CANCELLING POWER SUPPLY

(71) Applicant: DEAN TECHNOLOGY, INC., Addison, TX (US)

(72) Inventors: Lynn Edward Roszel, Wylie, TX (US); Craig Sean Dean, Carollton, TX (US); Scott Richard Wilson, Carrollton, TX (US); Erik Steven Haugarth, Plano, TX (US); Jan Simon Reuning, The Colony, TX (US)

(73) Assignee: DEAN TECHNOLOGY, INC., Addison, TX (US)

( * ) Notice: Subject to any disclaimer, the term of this patent is extended or adjusted under 35 U.S.C. 154(b) by 169 days.

(21) Appl. No.: 15/442,497

(22) Filed: Feb. 24, 2017

(65) Prior Publication Data
US 2017/0249001 A1    Aug. 31, 2017

Related U.S. Application Data

(60) Provisional application No. 62/300,352, filed on Feb. 26, 2016.

(51) Int. Cl.
*H02M 1/14* (2006.01)
*G06F 1/3296* (2019.01)
*G06F 1/324* (2019.01)

(52) U.S. Cl.
CPC ............ *G06F 1/3296* (2013.01); *G06F 1/324* (2013.01); *H02M 1/14* (2013.01)

(58) Field of Classification Search
CPC ............ H02M 1/12; H02M 1/14; H02M 1/15; H02M 1/143; H02M 1/44; H02M 2001/0012; Y02B 70/126; H02J 3/01; H02J 3/1814; H02J 3/1842; Y02E 40/40; G06F 1/26; H03F 2200/459; G05F 1/10; G05F 1/565; G05F 1/57
See application file for complete search history.

(56) References Cited

U.S. PATENT DOCUMENTS

| | | | |
|---|---|---|---|
| 2012/0134187 A1* | 5/2012 | Sutardja | G05F 1/70 363/89 |
| 2015/0244257 A1* | 8/2015 | Dalwadi | H02M 1/14 323/234 |
| 2016/0322896 A1* | 11/2016 | Davis | H02M 3/156 |
| 2016/0329805 A1* | 11/2016 | Ghosh | H02M 1/15 |

* cited by examiner

*Primary Examiner* — Jaweed A Abbaszadeh
*Assistant Examiner* — Brian J Corcoran
(74) *Attorney, Agent, or Firm* — Nolte Intellectual Property Law Group

(57) ABSTRACT

An active noise cancelling power supply to perform active noise cancelling of input power with noise to output power. The active noise cancelling power supply having a power transformation device receiving input power and converting the power to a voltage signal with a ripple. The active noise cancelling power supply has a ripple measuring device, which measures the ripple as the voltage signal with a ripple passes through the ripple measuring device producing a ripple signal. A controller with a data storage in communication with a processor, wherein computer instructions in the data storage are configured to instruct the processor to produce a first noise cancellation signal in volts or millivolts out of phase with the ripple signal and inject the first noise cancellation signal on the voltage signal with a ripple at a node forming a clean signal as output power.

4 Claims, 3 Drawing Sheets

ACTIVE NOISE CANCELLING POWER SUPPLY

CROSS REFERENCE TO RELATED APPLICATION

The present application claims priority to and the benefit of U.S. Provisional Patent Application Ser. No. 62/300,652 filed on Feb. 26, 2016, entitled "ACTIVE NOISE CANCELLING POWER SUPPLY". This reference is hereby incorporated in its entirety.

FIELD

The present embodiments generally relate to an active noise cancelling power supply.

BACKGROUND

A need exists for an active noise cancelling power supply, which can provide a clean power output with reduced ripple.

The present embodiments meet these needs.

BRIEF DESCRIPTION OF THE DRAWINGS

The detailed description will be better understood in conjunction with the accompanying drawings as follows.

Figure 1A:
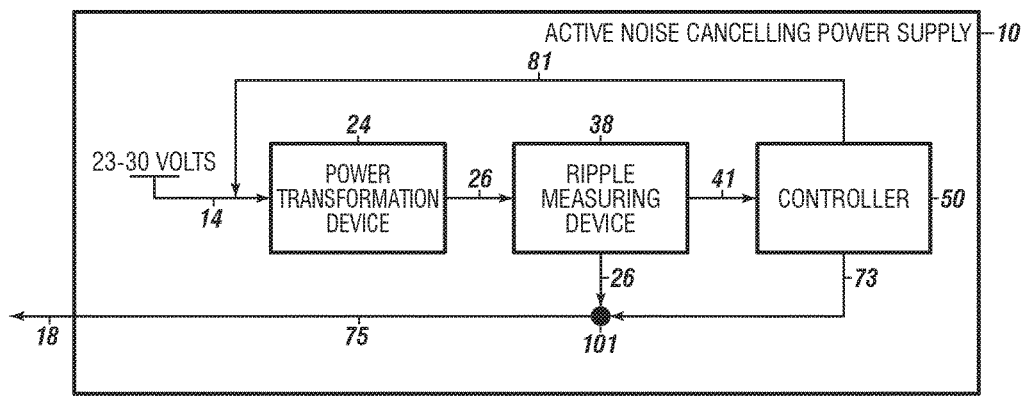
FIG. 1A depicts a diagram of a first embodiment of an active noise cancelling power supply.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The embodiments generally relate to an active noise cancelling power supply for smoothing out ripples in power and to perform active noise cancelling of input power with noise to output power.

The active noise cancelling power supply can have a power transformation device for receiving a voltage input power and converting the power to a voltage signal with a ripple.

The active noise cancelling power supply can have a ripple measuring device, which can measure the ripple as the voltage signal with the ripple passing through the ripple measuring device producing a ripple signal.

The active noise cancelling power supply can have a controller with computer instructions in a data storage configured to instruct a processor to produce a first noise cancellation signal in volts or millivolts out of phase with the ripple signal and inject the first noise cancellation signal on the voltage signal with a ripple forming a clean signal.

The device can be configured to detect variations in the first output voltage caused by distortion in at least one of: an input power, noise from at least one switching device, or ambient radiated emissions from an environmental source, and to superimpose onto the first output voltage a compensating out of phase signal.

The active noise cancelling power supply can provide a clean signal which will eliminate the need of large, complicated, and expensive output filters reducing the size and weight of medical equipment, which is needed in the event of a natural disaster.

The active noise cancelling power supply can provide clean and accurate power output in medical imaging applications, which can allow for early diagnosis of life threatening conditions and saves lives.

The active noise cancelling power supply can provide a clean output signal in a power supply. The clean output signal can enable faster shut down of the power supply quickly and accurately to prevent fires and explosions in the event of a fault or explosive overcurrent condition.

The active noise cancelling power supply can help save the environment by eliminating filter capacitors, which contain hazardous materials and can be toxic.

The active noise cancelling power supply can allow for a more accurate inspection of equipment on oil rigs preventing destructive and explosive conditions.

The term "clean signal" as used herein can refer to a combination of the corrected voltage signal using the out of phase signal with the original input signal with noise to reduce ripple for the output voltage.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals. The data storage can have computer instructions that activate the processor to perform operational steps.

The term "input power" as used herein can refer to a board AC source energy range, such as from 1 volt to 500 volts or a broad DC source range from 1 volt to 350 volts.

The term "noise" as used herein can refer to unwanted variations in the voltage or current of the input power.

The term "noise cancellation signal" as used herein can refer to an out of phase opposing waveform to the ripple signal.

The term "out of phase" as used herein can refer to a signal with an identical frequency of the ripple but with an opposite polarity.

The term "output power" as used herein can refer to an energy range that is similar to the input power with at least some reduced ripple.

The term "power transformation device" as used herein can refer to at least one or more of the following: a transformer, a pulse width modulator, a metal oxide semiconductor field effect transistor, an inductor, a buck to provide step down of voltage, a boost to provide step up of voltage, a Zener diode and a rectifier.

The term "processor" as used herein can refer to a computer, a programmable circuit board, a programmable logic circuit, or a similar device.

The term "ripple" as used herein can refer to small unwanted periodic variations in voltage or current.

The term "ripple measuring device" as used herein can be at least one of: a capacitor, a capacitive divider or an analog to digital converter with electronic conversion that does not lose the ripple signal in the resolution of the measuring device.

The term "ripple signal" as used herein can refer to an alternating current (A/C) signal that is representative of the noise on the direct current (D/C) voltage of the input voltage.

Figure 1B:
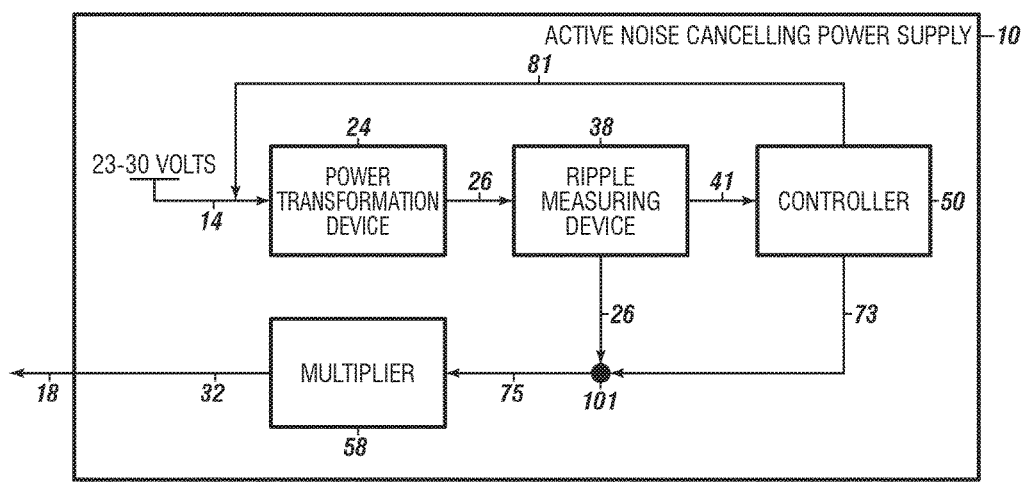
FIG. 1B depicts a diagram of a second embodiment of an active noise cancelling power supply according to one or more embodiments.
Figure 1C:
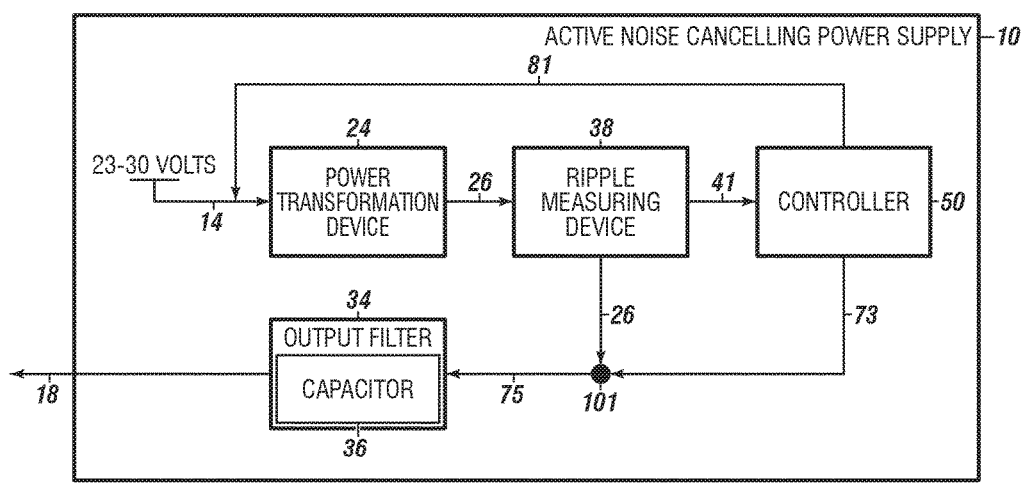
FIG. 1C depicts a diagram of a third embodiment of an active noise cancelling power supply.
Figure 1D:
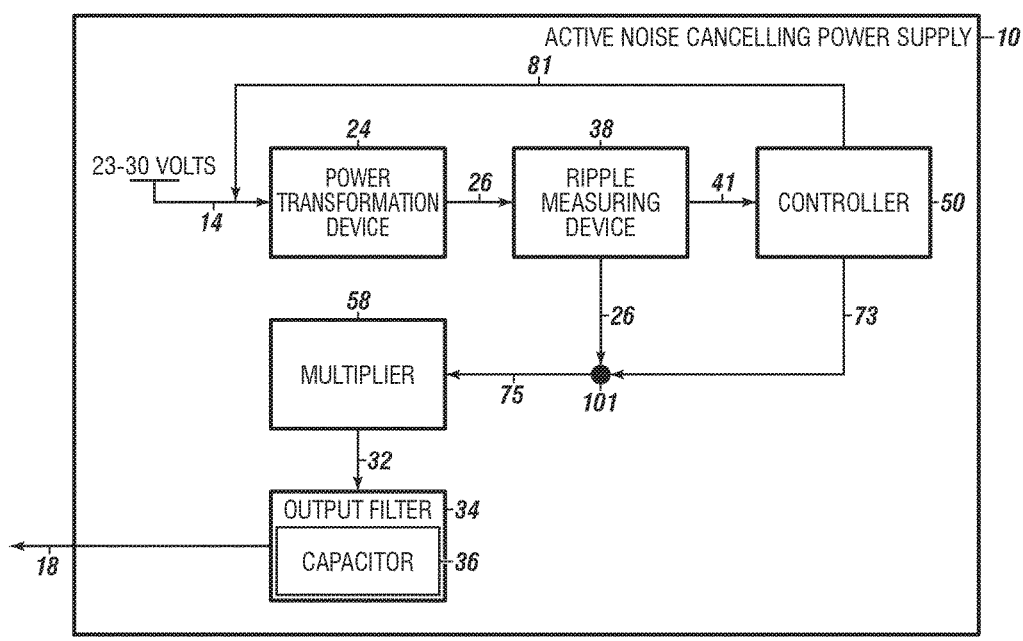
FIG. 1D depicts a diagram of a fourth embodiment of an active noise cancelling power supply.

Turning now to the Figures, FIG. 1A depicts a diagram of a first embodiment of an active noise cancelling power supply, FIG. 1B depicts a diagram of a second embodiment of an active noise cancelling power supply according to one or more embodiments, FIG. 1C depicts a diagram of a third embodiment of an active noise cancelling power supply, and FIG. 1D depicts a diagram of a fourth embodiment of an active noise cancelling power supply.

In reference to FIGS. 1A-1D, the active noise cancelling power supply 10 can be equipped to reduce noise in power caused by switching devices.

The active noise cancelling power supply 10 can perform active noise cancelling of input power with noise 14 and produce output power 18 with reduced ripple.

In embodiments, the active noise cancelling power supply can have a power transformation device 24 for receiving the input power with noise 14 and converting the input power with noise to a voltage signal with a ripple 26.

In embodiments, the power transformation device 24 can also receive a second noise cancellation signal 81 from a controller 50 for reducing ripple in a voltage signal.

The active noise cancelling power supply 10 can have a ripple measuring device 38. The ripple measuring device 38 can receive the voltage signal with a ripple 26 and measure the ripple as the voltage signal with a ripple 26 passes through the ripple measuring device 38 producing a ripple signal 41.

The controller 50 can be configured to receive the ripple signal 41. The controller 50 can calculate a first noise cancellation signal 73 and inject the first noise cancellation signal 73 on the voltage signal with a ripple 26 at a node 101 forming a clean signal 75. The clean signal 75 can form output power 18.

FIG. 1B shows a multiplier 58 receiving the clean signal 75 and then multiplying the clean signal 75 by at least a factor of two forming an increased voltage 32, which can form output power 18.

FIG. 1C depicts an output filter 34 for receiving the cleaned signal 75. The output filter 34 can be configured to further remove large distortions in voltage that cannot be removed by the controller 50. The output filter can form output power 18.

The output filter 34 can have a capacitor 36, which can be configured to smooth any remaining ripple in the clean signal 75.

FIG. 1D shows the power transformation device 24 for receiving the input power with noise 14 and converting the voltage input power with noise to the voltage signal with a ripple 26.

In this embodiment, the ripple measuring device 38 can receive the voltage signal with a ripple 26. The ripple measuring device can be configured to measure the ripple as the voltage signal with a ripple 26 passes through the ripple measuring device to the node 101. The ripple measuring device can produce the ripple signal 41.

The controller 50 can inject a first noise cancellation signal 73 onto the voltage signal with a ripple 26 at the node 101 forming a clean signal 75.

A multiplier 58 can receive the clean signal 75 and then multiply the clean signal 75 by at least a factor of two forming an increased voltage 32.

In this embodiment, an output filter 34 can receive the increased voltage 32. The output filter can remove large voltage distortions and form output power 18. The output filter can have the capacitor 36.

Figure 2:
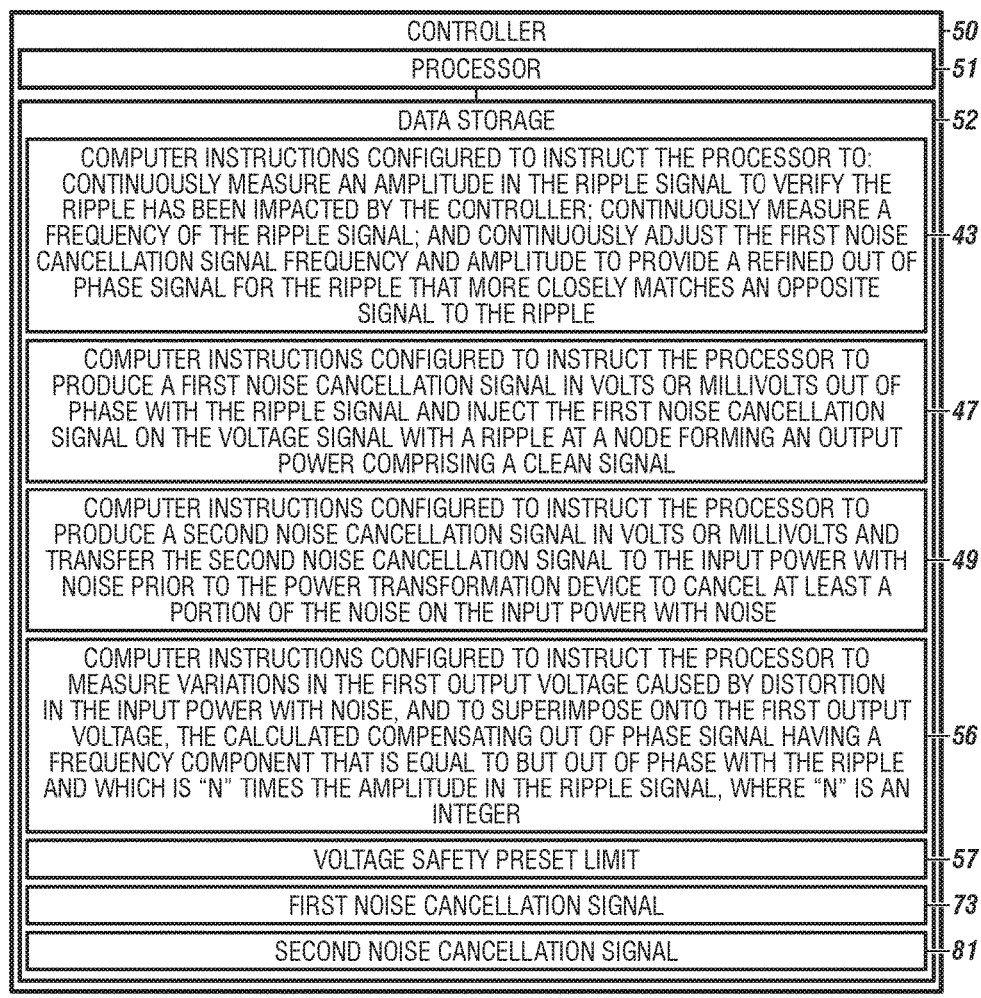
FIG. 2 depicts a diagram of the controller with a data storage according to one or more embodiments.

FIG. 2 depicts a diagram of the controller with a data storage according to one or more embodiments.

The controller 50 can contain a processor 51 and a data storage 52.

The data storage 52 can have computer instructions 43 configured to instruct the processor to: continuously measure an amplitude in the ripple signal to verify the ripple has been impacted by the controller, continuously measure a frequency of the ripple signal, and continuously adjust the first noise cancellation signal frequency and amplitude to provide a refined out of phase signal for the ripple that more closely matches an opposite signal to the ripple.

The data storage 52 can have computer instructions 47 configured to instruct the processor to produce a first noise cancellation signal in volts or millivolts out of phase with the ripple signal and inject the first noise cancellation signal on the voltage signal with a ripple at a node forming an output power comprising a clean signal.

The data storage 52 can have computer instructions 49 configured to instruct the processor to produce a second noise cancellation signal in volts or millivolts and and transfer the second noise cancellation signal to the input power with noise prior to the power transformation device to cancel at least a portion of the noise on the input power with noise.

The data storage 52 can have computer instructions 56 configured to instruct the processor to measure variations in the first output voltage caused by distortion in the input power with noise and to superimpose onto the first output voltage the calculated compensating out of phase signal having a frequency component that is equal to but out of phase with the ripple and which is "n" times the amplitude in the ripple signal, where "n" is an integer.

The data storage 52 can have a voltage safety preset limit 57, a first noise cancellation signal 73 and a second noise cancellation signal 81.

In embodiments, the volate safety preset limit can be used for protecting the controller 50.

While these embodiments have been described with emphasis on the embodiments, it should be understood that within the scope of the appended claims, the embodiments might be practiced other than as specifically described herein.

What is claimed is:

1. An active noise cancelling power supply to perform active noise cancelling of input power with noise to output power, the active noise cancelling power supply consisting of:

a. a power transformation device for receiving a DC input power with noise and converting the input power with noise to a voltage signal with a ripple, wherein the power transformation device consists of a member of the group: a transformer, a pulse width modulator, a metal oxide semiconductor field effect transistor, an inductor, a buck to provide step down of voltage, a boost to provide step up of voltage, a Zener diode and a rectifier;

b. a ripple measuring device for receiving the voltage signal with the ripple and measuring the ripple as the voltage signal with the ripple passes through the ripple measuring device producing a ripple signal, wherein the ripple measuring device consists of at least one of: a capacitor, a capacitive divider, analog to digital converter with electronic conversion that does not lose a ripple signal in a resolution of the ripple measuring device; and c. a controller configured to receive that ripple signal from the ripple measuring device, wherein the controller consisting of a non-transitory computer readable medium in communication with a processor, the non-transitory computer readable medium consisting of computer instructions that when executed by the processor are configured to cause the processor to:

produce a first noise cancellation signal in volts or millivolts out of phase with the ripple signal and to inject the first noise cancellation signal on the voltage signal with the ripple at a node forming an output power consisting of a clean signal;

produce a second noise cancellation signal in volts or millivolts and transfer the second noise cancellation signal to the input power with noise prior to the power transformation device to cancel at least a portion of the noise on the input power with noise;

measure variations in the ripple signal caused by distortion in the input power with noise and to superimpose onto the voltage signal with ripple, the first noise cancellation signal having a frequency component that is equal to but out of phase with the ripple, which is "n" times the amplitude in the ripple signal, where "n" is an integer;

and further wherein the data storage contains computer instructions configured to instruct the processor to:

(i) continuously measure an amplitude in the ripple signal to verify the ripple has been impacted by the processor;

(ii) continuously measure a frequency of the ripple signal; and (iii) continuously adjust the first noise cancellation signal frequency and amplitude to provide a refined out of phase signal for the ripple that closely matches an opposite signal to the ripple.

2. The active noise cancelling power supply of claim 1, further consisting of a multiplier for receiving the output power consisting of a clean signal and multiplying the output power consisting of a clean signal by at least a factor of two forming an increased voltage for the output power.

3. The active noise cancelling power supply of claim 2, further consisting of an output filter for receiving the increased voltage for the output power and removing large distortions in voltage that can not be removed by the processor and increased from the multiplier forming the increased voltage for the output power.

4. The active noise cancelling power supply of claim 3, wherein the output filter consists of: a capacitor, and wherein the capacitor is configured to smooth any remaining ripple in the clean signal or in the increased voltage.

* * * * *